United States Patent
Castaneda et al.

(10) Patent No.: US 7,523,197 B2
(45) Date of Patent: Apr. 21, 2009

(54) METHOD FOR IP ADDRESS DISCOVERY IN RAPIDLY CHANGING NETWORK ENVIRONMENT

(75) Inventors: Frank J. Castaneda, Raleigh, NC (US); Joseph Celi, Jr., Boca Raton, FL (US); David Lee Griffin, Raleigh, NC (US); Christopher James Martinez, Lake Worth, FL (US); Karen Neidlinger Momenee, Durham, NC (US); Amado Nassiff, Delray Beach, FL (US); Robert Selby Sielken, Chapel Hill, NC (US); William Carleton Wimer, II, Cary, NC (US); Steven Gary Woodward, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 11/371,783

(22) Filed: Mar. 9, 2006

(65) Prior Publication Data

US 2007/0214256 A1    Sep. 13, 2007

(51) Int. Cl.
*G06F 15/173* (2006.01)
(52) U.S. Cl. .................. 709/224; 709/232
(58) Field of Classification Search .............. None
See application file for complete search history.

(56) References Cited

U.S. PATENT DOCUMENTS

| | | | |
|---|---|---|---|
| 6,895,534 B2 * | 5/2005 | Wong et al. ............. 714/55 |
| 6,983,317 B1 * | 1/2006 | Bishop et al. ............. 709/223 |
| 2002/0012320 A1 | 1/2002 | Ogier et al. ............. 370/252 |
| 2002/0029275 A1 * | 3/2002 | Selgas et al. ............. 709/227 |
| 2002/0112067 A1 * | 8/2002 | Chang et al. ............. 709/232 |
| 2002/0116515 A1 | 8/2002 | Hashimoto ............. 709/230 |
| 2002/0143855 A1 * | 10/2002 | Traversat et al. ............. 709/202 |
| 2003/0072315 A1 | 4/2003 | Karino ............. 370/401 |
| 2004/0015547 A1 * | 1/2004 | Griffin et al. ............. 709/204 |
| 2004/0059963 A1 * | 3/2004 | Simonnet et al. ............. 714/47 |
| 2004/0202117 A1 * | 10/2004 | Wilson et al. ............. 370/310 |
| 2005/0012559 A1 | 1/2005 | Shimodaira et al. ............. 331/158 |
| 2005/0054343 A1 | 3/2005 | Nykanen et al. ............. 455/432.3 |
| 2005/0108390 A1 * | 5/2005 | Nickerson et al. ............. 709/224 |
| 2005/0208947 A1 | 9/2005 | Bahl ............. 455/450 |
| 2006/0123079 A1 * | 6/2006 | Sturniolo et al. ............. 709/203 |
| 2007/0027987 A1 * | 2/2007 | Tripp et al. ............. 709/225 |

\* cited by examiner

*Primary Examiner*—Ario Entienne
*Assistant Examiner*—Blake Rubin
(74) *Attorney, Agent, or Firm*—VanLeeuwen & VanLeeuwen

(57) ABSTRACT

A method for Internet protocol (IP) address discovery in a rapidly changing network environment is presented. A server and a client use an adaptive discovery polling process to determine an optimum heartbeat interval that minimizes network traffic and allows the server to monitor the client's source address. The client and server exchange discovery poll messages and heartbeat messages at varying time intervals in order to identify a computer network's timeout period or a network address translator's message block timeout period. Once the timeout period is identified, the client sends heartbeat messages to the server at an "optimum heartbeat interval" that is less than the identified timeout period in order to maintain the network connection. As a result, the server is able to send messages to the client without delay.

6 Claims, 8 Drawing Sheets

300 →

| DEVICE ID | SOURCE ADDRESS | DISCOVERY POLLING | | | OPTIMUM HEARTBEAT INTERVAL (sec.) | NAT/ FIREWALL PRESENT |
|---|---|---|---|---|---|---|
| | | LAST POLLING INTERVAL (sec.) | VALID? | CURRENT POLLING INTERVAL (sec.) | | |
| 439487 | 32.97.3.87 | 30 | Y | 40 | - | Yes |
| 59373 | 32.97.3.92 | - | - | - | 40 | Yes |
| 593378 | 46.91.3.75 | 20 | N | 10 | - | Yes |
| 6798776 | 32.97.3.48 | - | - | - | 60 | Yes |
| 993745 | 67.26.5.54 | 40 | Y | 50 | - | No |

METHOD FOR IP ADDRESS DISCOVERY IN RAPIDLY CHANGING NETWORK ENVIRONMENT

BACKGROUND OF THE INVENTION

1. Technical Field

The present invention relates to a system and method for Internet protocol (IP) address discovery in a rapidly changing network environment. More particularly, the present invention relates to a system and method for using an adaptive discovery polling process to determine an optimum heartbeat interval that minimizes network traffic and allows a server to monitor a client's source address.

2. Description of the Related Art

Short Message Service (SMS) is a popular method for sending messages between mobile devices. A person may use SMS to send a text message to a recipient device simply by entering the recipient device's phone number. The benefit of SMS is that the recipient's destination address (e.g., phone number) does not change. The sending person only needs to know a recipient's phone number in order to send a message to the recipient. A challenge found, however, is that SMS can only send relatively small messages (160 7-bit characters). In addition, if the SMS provider charges on a per message basis, the expense of using SMS may become cost prohibitive when a person wishes to send a large amount of messages.

Many enterprise class devices have access to an IP based data network that mobile network providers have implemented. These networks are capable of transporting application data over popular TCP and UDP network protocols. Unlike the SMS protocol, the IP networks are not restricted by a limited message size, and they also support extended conversations between client and server applications. Enterprise based applications have long used IP based communications as a standard, and may use TCP and UDP protocols to send a message to a mobile device as long as the device is listening on the IP network. A challenge found, however, is that this approach requires the enterprise application to know a mobile device's IP address in order to send a message to the correct recipient.

In addition, a challenge found is that in today's modern mobile IP networks, a mobile device is rarely assigned a permanent (static) IP address. The reason being is that a network provider typically has more registered devices than it has assignable IP addresses. The network provider understands, however, that all of the registered devices are not typically online at the same time. Therefore, the network provider dynamically allocates an IP address to a device when the device connects to network provider's network. As a result, the network provider does not run out of assignable IP addresses. A challenge found, however, is that when an IP address is inactive for a particular amount of time, the network provider de-allocates the IP address in order to re-allocate the IP address to another user.

Furthermore, in many cases, a device may not know its own dynamically assigned public IP address. Rather, the network provider assigns a "private IP" address to the mobile device, and then uses a network address translator (NAT) to convert the device's private address to a public address. Since a device's public IP address is not static, a challenge found is that an enterprise application is not able to send messages to the device when the enterprise application receives the message because the enterprise application may not know the device's current public IP address. Instead, the enterprise application relies upon the device to connect to the enterprise application and poll for messages, which are typically at fixed intervals.

What is needed, therefore, is a system and method for providing client source address information to an enterprise application utilizing minimal network traffic overhead.

SUMMARY

It has been discovered that the aforementioned challenges are resolved by a system and method for using an adaptive discovery polling process to determine an optimum heartbeat interval that minimizes network traffic and allows a server to monitor a client's source address. The client and server exchange discovery poll messages and heartbeat messages at varying time intervals in order to identify a computer network's timeout period or a network address translator's message block timeout period. Once the timeout period is identified, the client sends heartbeat messages to the server at an "optimum heartbeat interval" that is less than the identified network timeout period in order to maintain the network connection. As a result, the server is able to send messages to the client without delay.

A client wishes to register with a server over a computer network. To begin the registration process, the client ascertains its source address (e.g., through a socket request) and includes its source address, along with a device identifier, in a registration request. The client then sends the registration request to the server over the computer network, such as a wireless network.

The server receives the registration request, and extracts the source address, the device identifier, and a protocol layer address. The protocol layer address is an IP address that is embedded in the protocol layer meta data, and is the same as the client's source address if the computer network does not include a network address translator (NAT) or firewall. When a computer network includes a NAT or firewall, the protocol layer address is different than the client's source address. The server compares the source address with the protocol layer address, and determines whether the computer network includes a NAT or a firewall. The server also stores the client's device identifier, its source address, and NAT/firewall information in a lookup table.

When the computer network does not include a NAT or firewall, the server and the client enter into an "IP change" discovery process, which identifies the rate at which the client's source address changes due to the computer network's timeout period for client IP addresses. During this process, the server sends discovery poll intervals to the client that, in turn, sends a heartbeat message to the server at the discovery poll interval. The server checks the client's source address included in the heartbeat message for changes. When the server detects a change, the server determines that the last discovery poll interval that was sent to the client exceeded the computer network's timeout period. As such, the server and the client use the discovery poll interval prior to the failed discovery poll interval as an optimum heartbeat interval. The client then sends heartbeat messages to the server at the optimum heartbeat interval during a session monitoring stage.

When the computer network includes a NAT or firewall, the NAT/firewall blocks messages from the server to the client after a particular time, which is typically less than the computer network's timeout period. As such, the server and the client enter into a "message block" discovery process instead of an IP change discovery process as discussed above. During the message block discovery process, the server sends discovery poll messages at increasing intervals, and assumes that the client receives the discovery poll message. On the client side, the client sets a timer at the discovery poll intervals and expects to receive another discovery poll message when the timer expires. When the client does not receive a discovery poll message when expected, the client sends a heartbeat message to the server, which indicates that the NAT/firewall blocked that last discovery poll message. In turn, the client and the server revert back to the last valid discovery poll interval as the optimum heartbeat interval. The client then sends heartbeat messages to the server at the optimum heartbeat interval during the session monitoring stage.

In one embodiment, the server may use information from multiple clients operating on the same computer network to shorten the discovery process. In this embodiment, the server uses past "history" from other devices to intelligently determine the initial discovery poll interval. Since each session between the server and the other clients use a separate port value, the sessions operate independently. Meaning, the server may vary the discovery poll interval of different sessions to more quickly identify the optimum heartbeat interval.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 3 is a table showing discovery poll interval and optimum heartbeat interval information for device network connections;

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
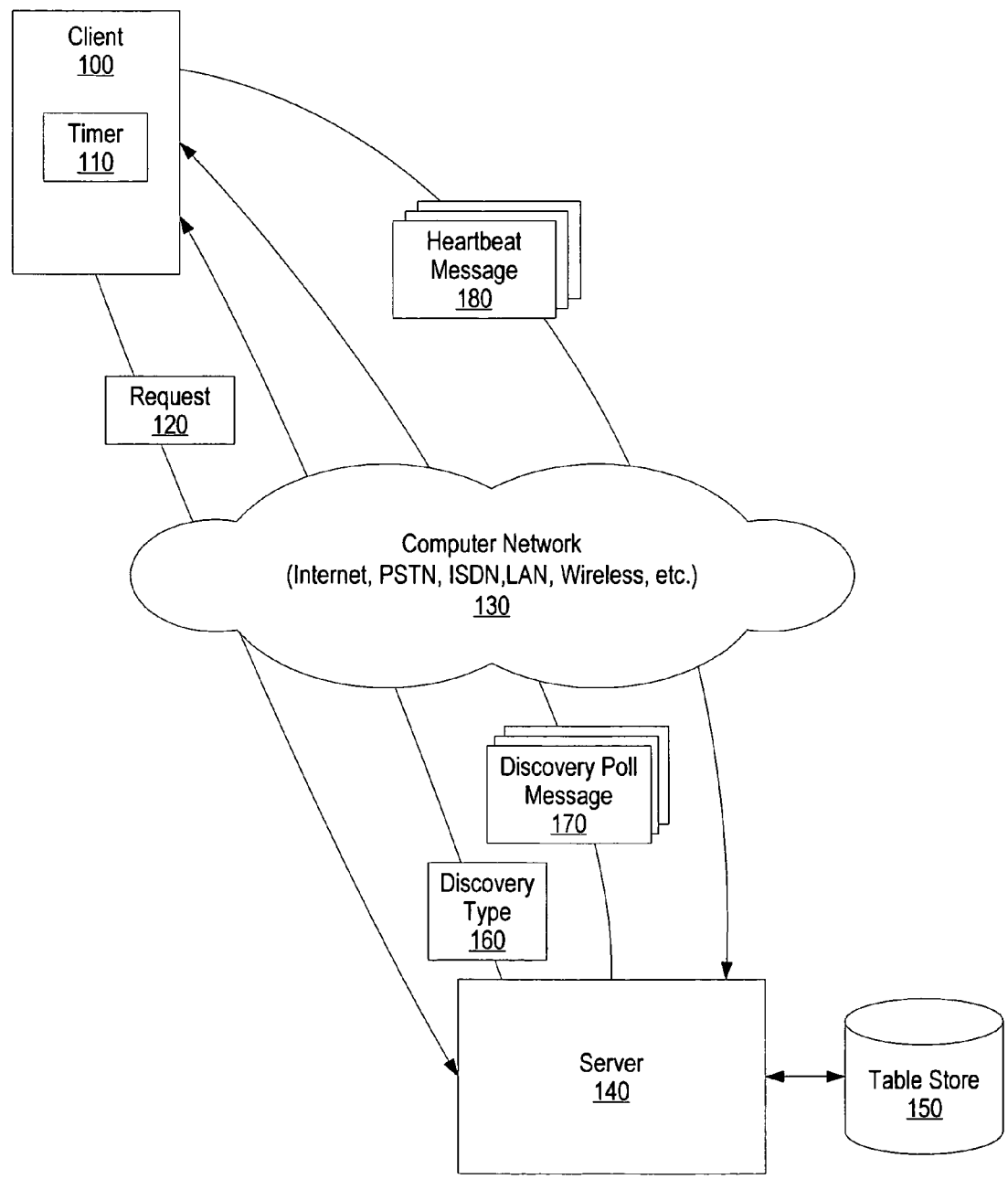
FIG. 1 is a diagram showing a server identifying an optimum heartbeat interval with a client over a computer network connection that does not include a NAT or firewall.

FIG. 1 is a diagram showing a server identifying an optimum heartbeat interval with a client over a computer network connection. The optimum heartbeat interval is based upon computer network 130's "network timeout period," which is the amount of time that computer network 130 allows client 100 to be inactive before changing client 100's source address. The optimum heartbeat interval minimizes the number of messages that are exchanged between client 100 and server 140, while providing an accurate indication to server 140 of client 100's source address. As a result, server 140 is able to send messages to client 100 without delay.

Client 100 wishes to register with server 140 over computer network 130. To begin the registration process, client 100 ascertains its source address (e.g., through a socket request) and includes its source address, along with a unique device identifier (e.g., serial number, subscriber number, etc.), in registration request 120. Client 100 then sends request 120 to server 140 over computer network 130, such as a wireless network.

Server 140 receives request 120, and extracts the source address, the device identifier, and a protocol layer address from request 120. The protocol layer address is an IP address that is embedded in the protocol layer meta data, and is the same as client 100's source address if computer network 130 does not include a network address translator (NAT) or firewall. If computer network includes a NAT or firewall, the protocol layer address is different than client 100's source address (see FIG. 2 and corresponding text for further details).

Server 140 compares the source address with the protocol layer address, and determines that computer network 130 does not include a NAT or a firewall. Server 140 stores client 100's device identifier, its source address, and information that network connection 130 does not include a NAT or firewall in a table located in table store 150 (see FIG. 3 and corresponding text for further details regarding table properties).

Since computer network 130 does not include a NAT or firewall, server 140 and client 100 enter into an "IP change" discovery process, which identifies the rate at which client 100's source address changes due to computer network 130's timeout period. To begin, server 140 sends discovery type 160 to client 100, which informs client 100 to begin the IP change discovery process. Server 140 sends discovery poll message 170, which includes a discovery poll interval, to client 100. The discovery poll interval is the amount of time that client 100 should wait before sending heartbeat message 180. Client 100 loads timer 110 with the discovery poll interval, and starts timer 110. Once timer 100 expires, client 100 sends heartbeat message 180 to server 140. Server 140 extracts the source address included in heartbeat message 180, and compares it with the client 100's previous source address, which is stored in table store 150.

If the discovery poll interval is less than computer network 130's timeout period, the previous source address and the extracted source address will be the same. If the source addresses are the same, server 140 logs that the discovery poll interval was successful in table store 150, adjusts (e.g., increases) the discovery poll interval, and sends the increased discovery poll interval via another discovery poll message 170 to client 100. Again, client 100 loads the adjusted discovery poll interval into timer 110, and when timer 110 times out, client 100 sends another heartbeat message 180 to server 140. This exchange between client 100 and server 140 continues until server 140 detects that client 100's source address changed, signifying that the recent discovery poll interval is greater than computer network 130's timeout period.

At this point, server 140 stores the last, valid, discovery poll interval as the optimum heartbeat interval, which is an interval that allows client 100 to maintain its source address, but also minimizes network traffic. Server 140 sends the optimum heartbeat interval to client 100 via another discovery poll message 170, and exits the IP change discovery process. In order to inform client 100 that the IP change discovery process is complete, server 140 may set a bit in discovery poll message 170 that signifies the included discovery poll interval is the optimum heartbeat interval.

Client 100 receives the optimum heartbeat interval, stores it in timer 110, and exits the IP change discovery process. At this point, client 100 and server 140 are in a "session monitoring" stage. During the session monitoring stage, client 100 sends heartbeat messages 180 to server 140 at the optimum heartbeat interval. In turn, server 140 monitors client 100's source address for changes. If server 140 detects a change, server 140 and client 100 return to the IP change discovery process. For example, computer network 130 may change its network timeout period based upon peak traffic hours. In this example, the optimum heartbeat interval may have been determined during non-peak hours and, when peak hours begin, computer network 130 decreases the network timeout period, which changes client 100's source address (see FIG. 7 and corresponding text for further details).

In one embodiment, server 140 may use information from multiple clients operating on the same computer network to shorten the IP change discovery process. In this embodiment, server 140 uses past "history" from other devices to intelligently determine the initial discovery poll interval. Since each session between server 140 and the other clients use a separate port value, the sessions operate independently. Meaning, server 140 may vary the discovery poll interval of different sessions to more quickly identify computer network 130's timeout period.

In another embodiment, multiple discovery sessions may be initiated with the same client device at the same time, each using different discovery poll intervals. This embodiment allows server 140 to identify the optimum heartbeat interval for the client in a shorter amount of time compared to invoking a single discovery session.

Figure 2:
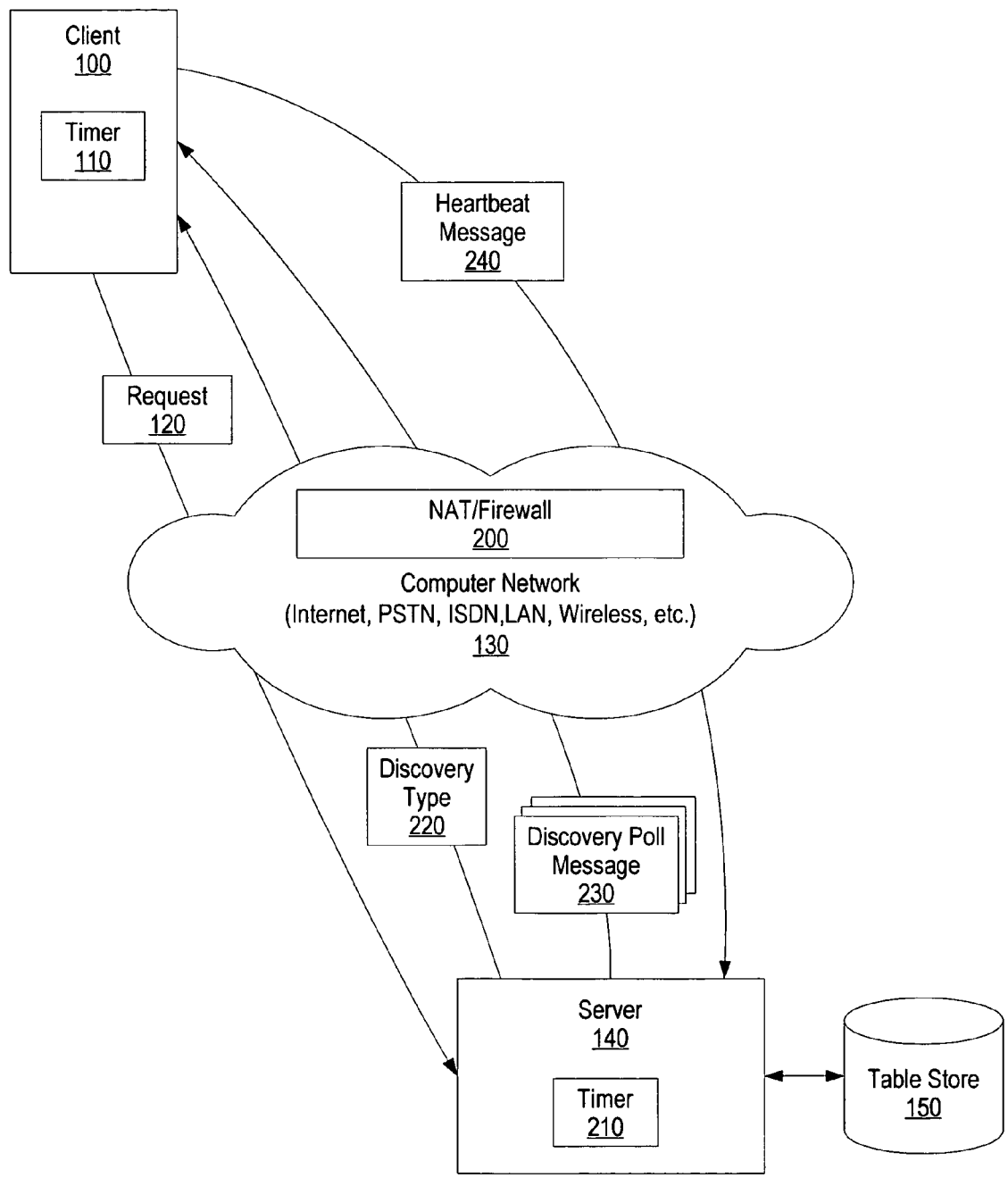
FIG. 2 is a diagram showing a server identifying an optimum heartbeat interval with a client over a computer network that includes a network address translator (NAT) or a firewall.

FIG. 2 is a diagram showing a server identifying an optimum heartbeat interval with a client over a computer network that includes a network address translator (NAT) or a firewall. FIG. 2 is similar to FIG. 1 with the exception that computer network 130 includes network address translator (NAT)/firewall 200. NAT/firewall 200 blocks messages from server 140 to client 100 after a particular time, which is typically less than computer network 130's timeout period. As such, server 140 and client 100 perform a "message block" discovery process instead of an IP change discovery process as discussed in FIG. 1.

To register with server 140, client 100 obtains its source address, includes it in request 120 along with its device identifier, and sends request 120 to server 140 through computer network 130. This time, when request 120 proceeds through computer network 130, NAT/firewall changes request 120's protocol layer IP address. As a result, when server 140 compares client 100's source address with the protocol layer address, server 140 determines that NAT/firewall 200 exists in computer network 130. As a result, server 140 sends discovery type 220 to client 100, which informs client 100 to begin a message block discovery process.

Server 140 starts the message block discovery process by identifying a discovery poll interval and loading the discovery poll interval into timer 210. Server 140 then includes the discovery poll interval in discovery poll message 230, and sends it to client 100, which client 100 loads into timer 110. Client 100 and server 140 start timer 110 and 210, respectively.

If server 140 does not receive heartbeat message 240 before timer 210 expires, it assumes that client 100 received the previous discovery poll message. Therefore, server 140 adjusts (increases) the discovery poll interval and sends it to client 100 via another discovery poll message 230. Client 100 waits for either timer 110 to expire or for another discovery poll message 230 from server 140. When it receives another discovery poll message, client 100 resets timer 110 to the adjusted discovery poll interval. This process continues until timer 110 expires due to NAT/firewall 200 blocking the poll message 230. At this point, client 100 stores the last discovery poll interval as the optimum heartbeat interval, sends heartbeat 240 to server 140, and enters the session monitoring stage.

Server 140 receives heartbeat message 240 from client 100, which indicates that NAT/firewall 200 blocked server 140's previous discovery poll message. As a result, server 140 identifies the last successful discovery poll interval as the optimum heartbeat interval, and enters into the session monitoring stage. At this point, client 100 sends heartbeat messages 240 at the optimum heartbeat interval. As discussed in FIG. 1, and is the same for FIG. 2, server 140 monitors client 100's source address for changes. If server 140 detects a source address change, server 140 and client 100 enter back into the message block discovery process to identify a new optimum heartbeat interval.

FIG. 3 is a table showing discovery poll interval and optimum heartbeat interval information for device network connections. A server stores network connection information in table 300 in order to identify and track optimum heartbeat intervals for particular clients.

Table 300 includes seven columns, which are columns 310 through 370. Column 310 includes device identifiers that correspond to a particular client. Column 320 includes source addresses that are assigned to the clients by their particular network.

Columns 330 through 350 include information that the server uses during a client's discovery poll process. Column 330 includes a discovery poll interval that was last sent to the client. Column 340 tracks whether the last discovery poll interval was valid (did not result in a changed source address or a blocked message). And, column 350 includes discovery poll intervals that are currently under test and have not yet been identified as valid or invalid.

Once the server identifies an optimum heartbeat interval for a client's network connection, the server stores the interval in column 360. Column 370 includes information that identifies whether a network connection includes a network address translator or firewall, which may block messages from the server to the client (see FIGS. 2, 4, 6, and corresponding text for further details).

Figure 4:
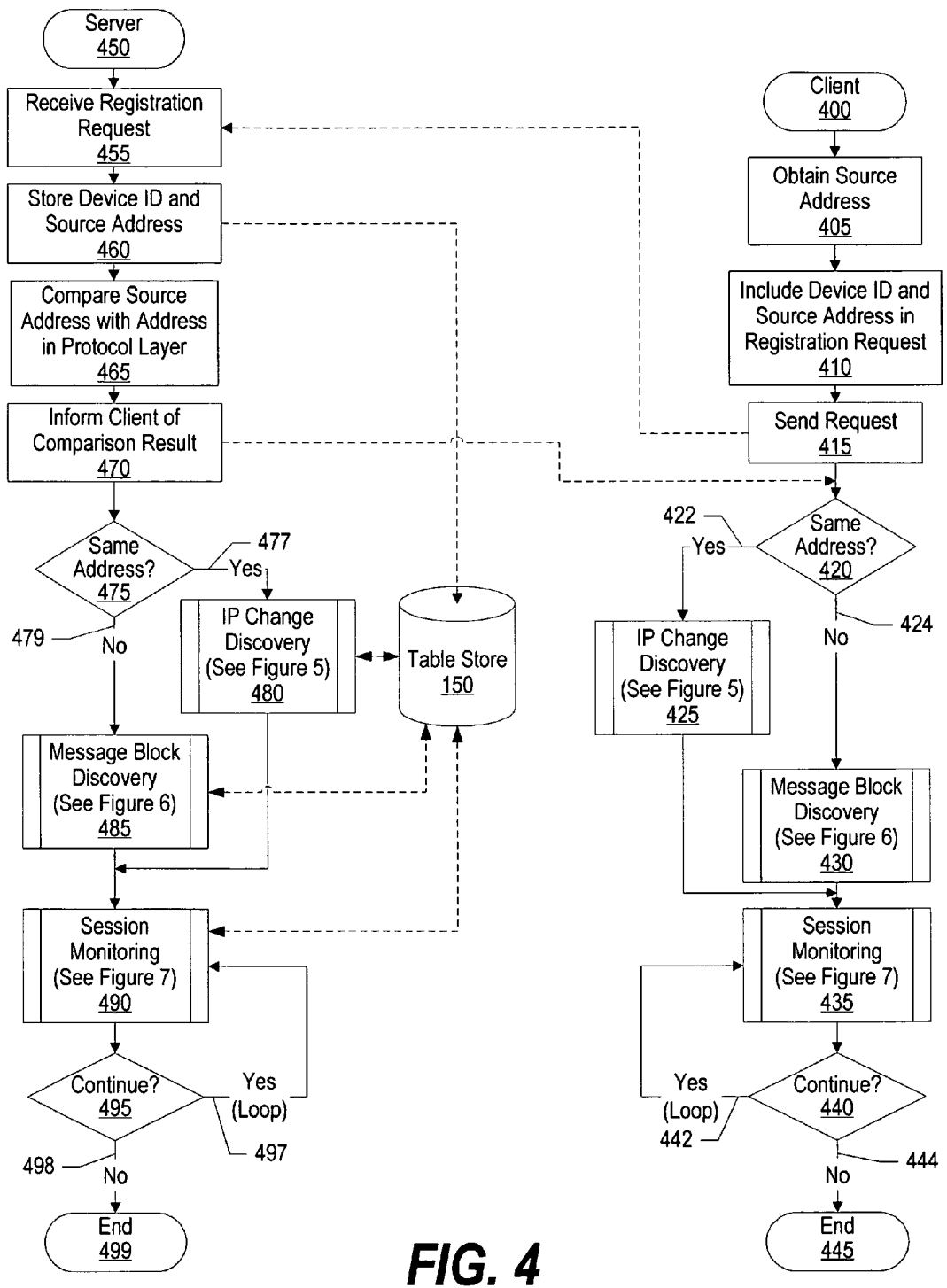
FIG. 4 is a high-level flowchart showing steps taken in identifying an optimum heartbeat interval between a server and a client.

FIG. 4 is a high-level flowchart showing steps taken in identifying an optimum heartbeat interval between a server and a client. Client processing commences at 400, whereupon the client obtains a source address (e.g., through a socket request), from the network at step 405. The client includes the source address and its device identifier (e.g., serial number) in a registration request (step 410), and sends the registration request to the server at step 415.

Server processing commences at 450, whereupon the server receives the registration request at step 455. At step 460, the server stores the client's device identifier and source address in table store 150. Table store 150 is the same as that shown in FIG. 1, and may be stored on a nonvolatile storage area, such as a computer hard drive.

The server extracts an address in the registration request's protocol layer, and compares the protocol layer address with the source address at step 465. By comparing these addresses, the server is able to identify whether a network address translator (NAT) or firewall exists on the network connection (see FIGS. 1, 2, and corresponding text for further details). At step 470, the server informs the client of the comparison results, which signifies whether to enter either an IP change discovery process or a message block discovery process.

A determination is made at the server as to whether the addresses are the same (decision 475). If the addresses are the same, the network connection does not include a NAT or firewall, and decision 475 branches to "Yes" branch 477 whereupon the server identifies the optimum heartbeat interval through an IP change discovery process (pre-defined process block 480, see FIG. 5 and corresponding text for further details). On the other hand, if the addresses are different, the network connection includes a NAT or firewall, and decision 475 branches to "No" branch 479 whereupon the server identifies the optimum heartbeat interval through a message block discovery process (pre-defined process block 485, see FIG. 6 and corresponding text for further details). Both the IP change discovery process and the message block discovery process access information in table store 150 while identifying the optimum heartbeat interval.

When the client receives the comparison result from the server, a determination is made at the client as to whether to enter the IP change discovery process or the message block discovery process (decision 420). If the addresses are the same, decision 420 branches to "Yes" branch 422 whereupon the client assists in identifying the optimum heartbeat interval through the IP change discovery process (pre-defined process block 425, see FIG. 5 and corresponding text for further details). On the other hand, if the addresses are different, decision 420 branches to "No" branch 424 whereupon the client assists in identifying the optimum heartbeat interval through the message block discovery process (pre-defined process block 430, see FIG. 6 and corresponding text for further details).

Figure 7:
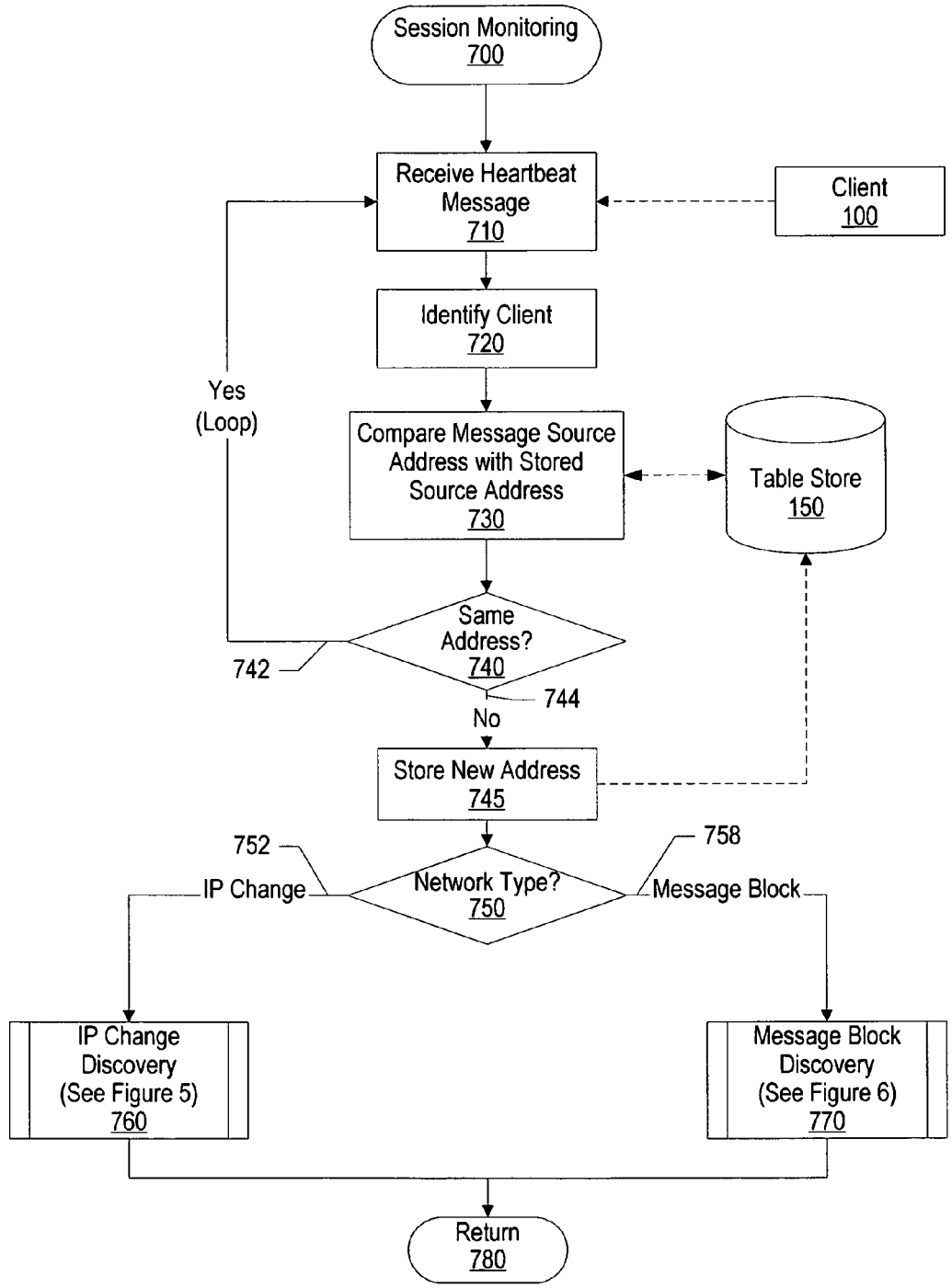
FIG. 7 is a flowchart showing steps taken in monitoring a client's source address during a session monitoring stage.

Once the discovery process is complete, client processing proceeds into a session monitoring stage (pre-defined process block 435, see FIG. 7 and corresponding text for further details). A determination is made at the client as to whether to maintain the network connection (decision 440). If the client should maintain the network connection, decision 440 branches to "Yes" branch 442 which loops back to continue session monitoring. This looping continues until the client should disconnect from the network connection, at which point decision 440 branches to "No" branch 444 whereupon client processing ends at 445.

Likewise, once the discovery process is complete, server processing proceeds into a session monitoring stage (pre-defined process block 490, see FIG. 7 and corresponding text for further details). A determination is made as to whether to maintain the network connection (decision 495). If the server should maintain the network connection, decision 495 branches to "Yes" branch 497 which loops back to continue session monitoring. This looping continues until the server should disconnect from the network connection, at which decision 495 branches to "No" branch 498 whereupon server processing ends at 499.

Figure 5:
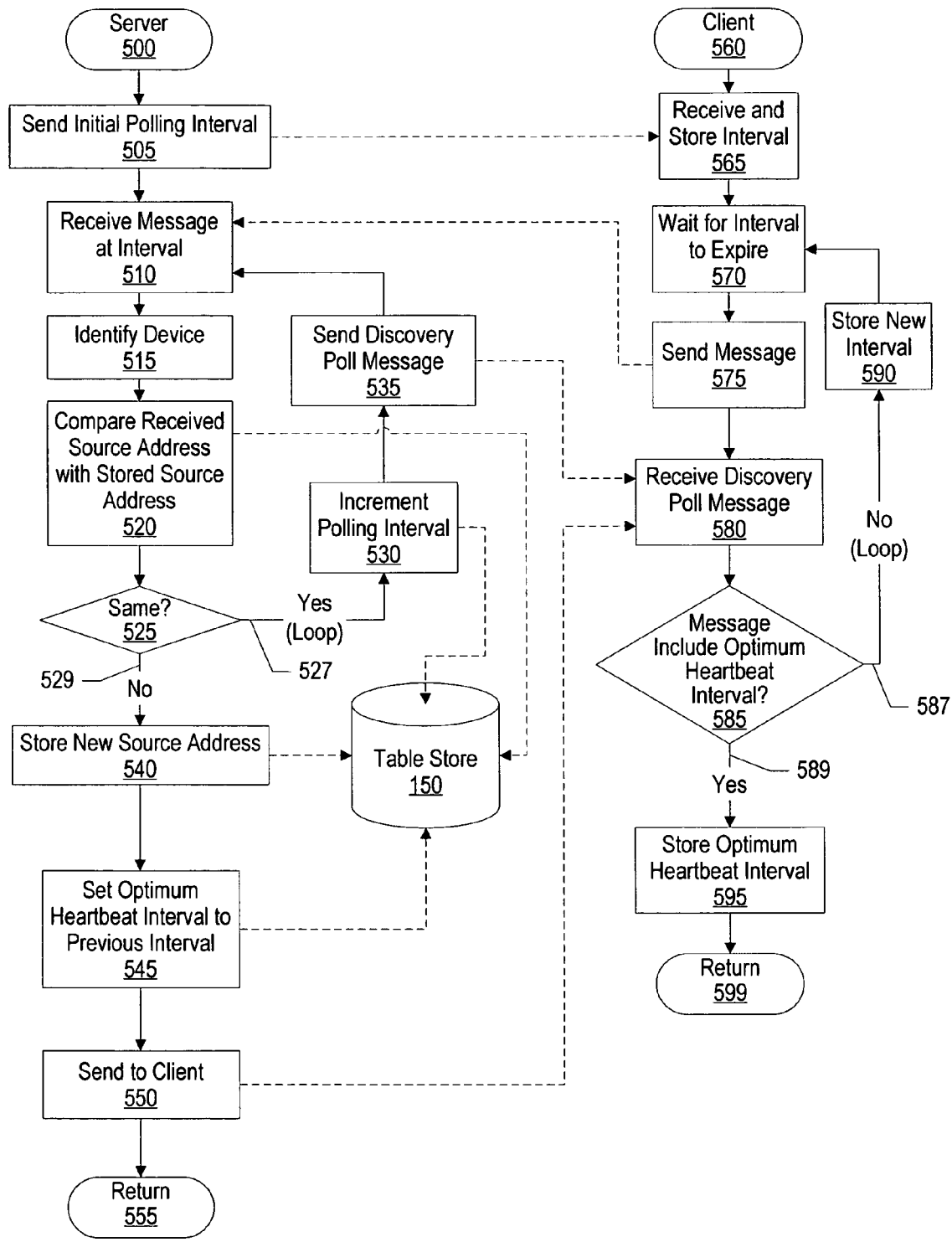
FIG. 5 is a flowchart showing steps taken in identifying an optimum heartbeat interval between a server and a client using a network connection that does not include a network address translator (NAT) or a firewall.

FIG. 5 is a flowchart showing steps taken in an IP change discovery process that identifies an optimum heartbeat interval between a server and a client using a network connection that does not include a network address translator (NAT) or a firewall. In this embodiment, the server receives heartbeat messages from the client at discovery poll intervals, and the server responds by either adjusting the discovery poll interval or setting a discovery poll interval as an "optimum heartbeat interval."

Server processing commences at 500, whereupon the server sends an initial discovery poll interval to the client at step 505. Client processing commences at step 560, whereupon the client receives the initial discovery poll interval at step 565. For example, the initial discovery poll interval may be 20 seconds. At step 570, the client waits for the discovery poll interval to expire (e.g., 20 seconds). Once the interval expires, the client sends a heartbeat message to the server at step 575.

The server receives the heartbeat message at step 510, which includes a device identifier corresponding to the client, as well as a source address corresponding to the client's network connection. The server identifies the client at step 515 using the device identifier, and compares the source address included in the heartbeat message with the source address that was included in the registration request and previously stored (step 520) (see FIG. 4 and corresponding text for further details).

A determination is made as to whether the source address in the heartbeat message is different than the stored source address (decision 525). For example, if the network changes an inactive client's source address at intervals less than the discovery poll interval (network timeout period), the heartbeat message's source address will be different that the stored source address.

If the heartbeat message's source address is the same as the stored source address, decision 525 branches to "Yes" branch 527 which loops back to adjust (increment) the discovery poll interval (step 530) and send the adjusted discovery poll interval to the client at step 535. The server also stores the adjusted discovery poll interval in table store 150, which is the same as that shown in FIG. 1.

The client receives the adjusted discovery poll interval at step 580. A determination is made as to whether the message includes an optimum heartbeat interval or an incremented discovery poll interval (decision 585). For example, the message may include a bit that signifies whether the interval value corresponds to an incremented discovery poll interval or an optimum heartbeat interval. If the message includes an adjusted discovery poll interval, decision 585 branches to "No" branch 587 which loops back to store the adjusted discovery poll interval (step 590), waits the amount of time specified as the adjusted discovery poll interval (step 570), and sends a heartbeat message to the server (step 575).

Back at the server, when the server detects that a received heartbeat message is different than the stored source address, decision 525 branches to "No" branch 529 indicating that the discovery poll interval is greater than the computer network timeout period. At this point, the server stores the heartbeat message's new source address in table store 150 (step 540). In addition, the server sets the optimum heartbeat interval in table store 150 to a previously validated discovery poll interval at step 545. At step 550, the server sends the optimum heartbeat interval to the client for subsequent heartbeat message transmissions (step 595), and server processing returns at 555.

When the client receives the optimum heartbeat message from the server at step 580, decision 585 branches to "Yes" branch 589 whereupon the client stores the optimum heartbeat interval for subsequent heartbeat message transmissions, and client processing returns at 599.

Figure 6:
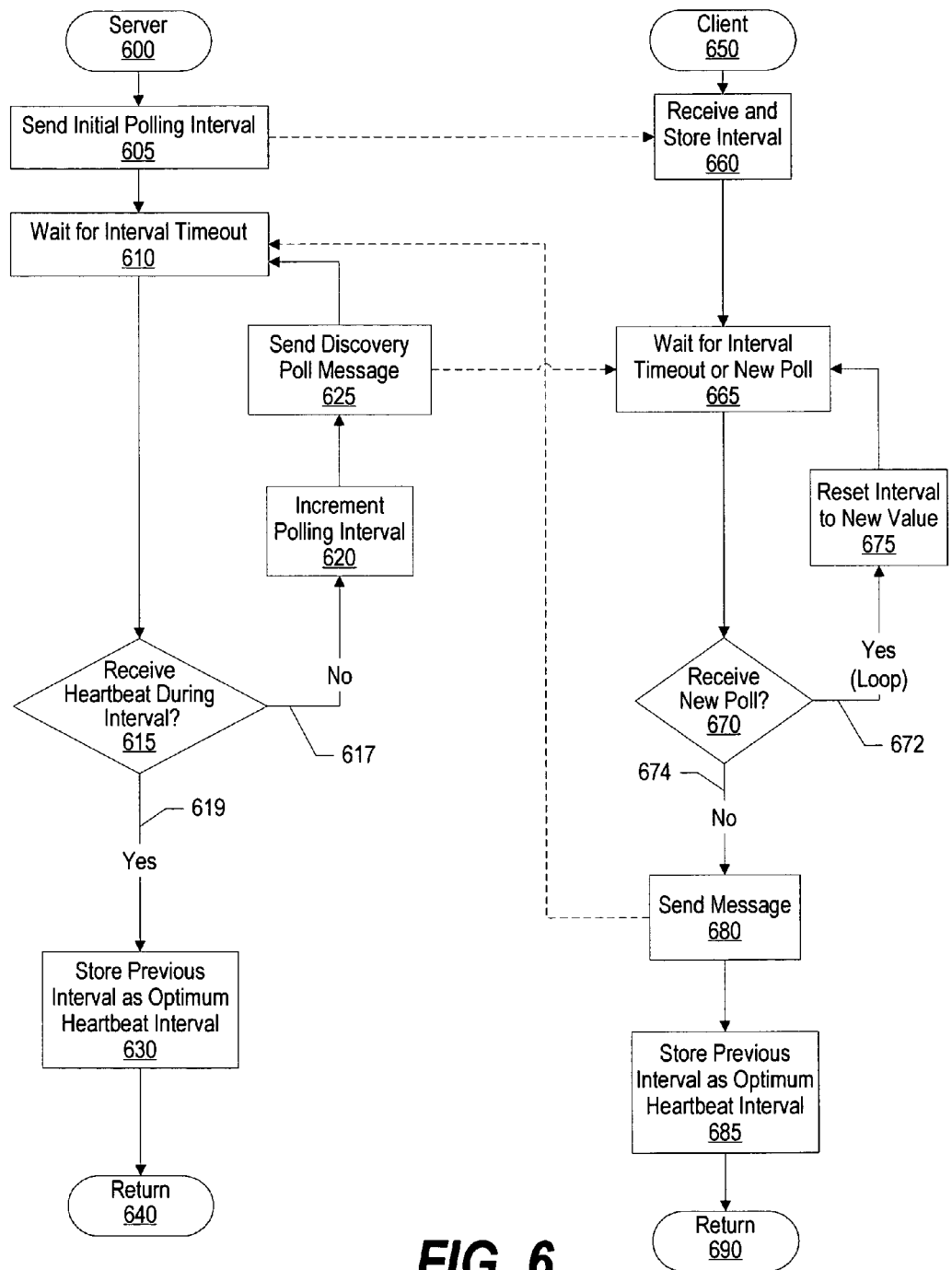
FIG. 6 is a flowchart showing steps taken in identifying an optimum heartbeat interval between a server and a client over a computer network that includes a network address translator (NAT) or a firewall.

FIG. 6 is a flowchart showing steps taken in a message block discovery process, which identifies an optimum heartbeat interval between a server and a client over a computer network that includes a network address translator (NAT) or a firewall. In this embodiment, the server sends discovery poll messages to the client in order to maintain a network connection through the NAT. The client monitors the discovery poll intervals and, when the client detects that one of the discovery poll intervals has been blocked by the NAT or firewall, the client sends a heartbeat message to the server that informs the server of the blocked discovery poll message.

Server processing commences at 600, whereupon the server sends an initial discovery poll interval to the client at step 605. Client processing commences at step 650, whereupon the client receives the initial discovery poll interval at step 660. The client waits for the discovery poll interval to expire, at which point the client expects to receive another discovery poll message from the server (step 665).

The server waits for the discovery poll interval to expire at step 610, and a determination is made as to whether the server received a heartbeat message from the client during the discovery poll interval (decision 615), indicating that the client did not receive the previous discovery poll message. For example, if a NAT blocks messages for network connections that are inactive for more than fifty seconds, and the client expects to receive a new discovery poll message in sixty seconds, the client will not receive the discovery poll message, in which case the client sends a heartbeat message to the server (discussed below). If the server did not receive a heartbeat message, (indicating that the client received the expected discovery poll message), decision 615 branches to "No" branch 617 whereupon the server adjusts (increments) the discovery poll interval at step 620, and sends the adjusted discovery poll interval in a discovery poll message to the client at step 625.

On the client side, a determination is made as to whether the client receives a discovery poll message at the expiration of the discovery poll interval timeout (decision 670). If the client receives another discovery poll message, decision 670 branches to "Yes" branch 672 which loops back to reset the discovery poll interval to the adjusted discovery poll interval (step 675).

On the other hand, if the client does not receive another discovery poll message at the discovery poll interval timeout, decision 670 branches to "No" branch 674, indicating that the discovery poll message was blocked by the NAT or firewall. At step 680, the client sends a heartbeat message to the server, indicating that the client did not receive the last discovery poll message. As a result, the client stores a previously validated discovery poll interval as an optimum heartbeat interval (step 685), and client processing returns at 690.

On the server side, when the server receives the heartbeat message at step 610, decision 615 branches to "Yes" branch 619 whereupon the server stores the previously validated discovery poll interval as an optimum heartbeat interval (step 630), and server processing returns at 640.

FIG. 7 is a flowchart showing steps taken in monitoring a client's source address during a session monitoring stage. After a server and client establish an optimum heartbeat interval (see FIGS. 5 and 6), the server continues to monitor the client's source address for changes. A change may be due to the network adjusting network timeout periods during busy times of the day. For example, a network have a network timeout period set at 60 seconds during non-congested hours, such as 2 AM, and have it set to a shorter duration (e.g., 30 seconds) during congested hours, such as 9 AM.

Session monitoring commences at 700, whereupon the server receives a heartbeat message from client 100 at the optimum heartbeat interval (step 710). Client 100 is the same as that shown in FIG. 1. The server identifies client 100 at step 720 using a device identifier included in the heartbeat message, and compares the source address included in the received heartbeat message with a source address that was previously stored in table store 150 during the discovery poll process (step 730). Table store 150 is the same as that shown in FIG. 1.

A determination is made as to whether the heartbeat message's source address is the same as the stored source address (decision 740). For example, if the network has not changed its parameters, the source address will be the same because the heartbeat messages are sent at an interval less than the network timeout period, thus keeping client 100's source address the same.

If the heartbeat source address and the stored source address are the same, decision 740 branches to "Yes" branch 742 which loops back to receive and process heartbeat messages. This looping continues until the heartbeat message source address is different than the stored source address, at which point decision 740 branches to "No" branch 744 whereupon the server stores the new source address in table store 150 (step 745).

A determination is made as to whether the network connection between the server and the client includes a network address translator or a firewall (decision 750). The server determines this by accessing a table included in table store 150 that identifies the network connection type (see FIG. 3 and corresponding text for further details).

If the network connection does not include a network address translator or a firewall, decision 750 branches to "IP change" branch 752 whereupon processing proceeds to an IP change discovery process (pre-defined process block 760, see FIG. 5 and corresponding text for further details). On the other hand, if the network includes a network address translator or a firewall, decision 750 branches to "Message Block" branch 758 whereupon processing proceeds to a message block discovery process (pre-defined process block 770, see FIG. 6 and corresponding text for further details). Processing returns at 780.

Figure 8:
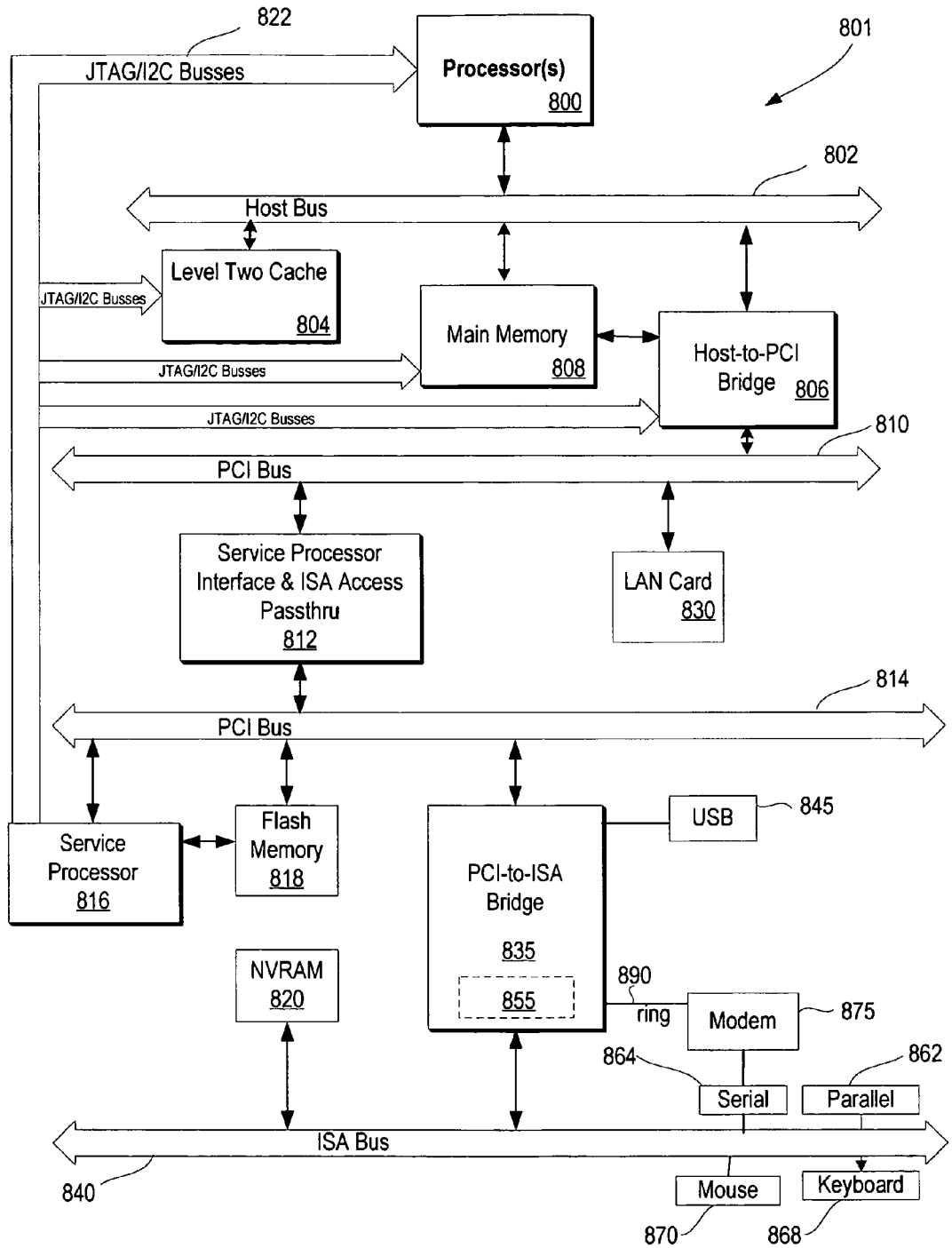
FIG. 8 is a block diagram of a computing device capable of implementing the present invention.

FIG. 8 illustrates information handling system 801 which is a simplified example of a computer system capable of performing the computing operations described herein. Computer system 801 includes processor 800 which is coupled to host bus 802. A level two (L2) cache memory 804 is also coupled to host bus 802. Host-to-PCI bridge 806 is coupled to main memory 808, includes cache memory and main memory control functions, and provides bus control to handle transfers among PCI bus 810, processor 800, L2 cache 804, main memory 808, and host bus 802. Main memory 808 is coupled to Host-to-PCI bridge 806 as well as host bus 802. Devices used solely by host processor(s) 800, such as LAN card 830, are coupled to PCI bus 810. Service Processor Interface and ISA Access Pass-through 812 provides an interface between PCI bus 810 and PCI bus 814. In this manner, PCI bus 814 is insulated from PCI bus 810. Devices, such as flash memory 818, are coupled to PCI bus 814. In one implementation, flash memory 818 includes BIOS code that incorporates the necessary processor executable code for a variety of low-level system functions and system boot functions.

PCI bus 814 provides an interface for a variety of devices that are shared by host processor(s) 800 and Service Processor 816 including, for example, flash memory 818. PCI-to-ISA bridge 835 provides bus control to handle transfers between PCI bus 814 and ISA bus 840, universal serial bus (USB) functionality 845, power management functionality 855, and can include other functional elements not shown, such as a real-time clock (RTC), DMA control, interrupt support, and system management bus support. Nonvolatile RAM 820 is attached to ISA Bus 840. Service Processor 816 includes JTAG and I2C busses 822 for communication with processor(s) 800 during initialization steps. JTAG/I2C busses 822 are also coupled to L2 cache 804, Host-to-PCI bridge 806, and main memory 808 providing a communications path between the processor, the Service Processor, the L2 cache, the Host-to-PCI bridge, and the main memory. Service Processor 816 also has access to system power resources for powering down information handling device 801.

Peripheral devices and input/output (I/O) devices can be attached to various interfaces (e.g., parallel interface 862, serial interface 864, keyboard interface 868, and mouse interface 870 coupled to ISA bus 840. Alternatively, many I/O devices can be accommodated by a super I/O controller (not shown) attached to ISA bus 840.

In order to attach computer system 801 to another computer system to copy files over a network, LAN card 830 is coupled to PCI bus 810. Similarly, to connect computer system 801 to an ISP to connect to the Internet using a telephone line connection, modem 885 is connected to serial port 864 and PCI-to-ISA Bridge 835.

While FIG. 8 shows one information handling system that employs processor(s) 800, the information handling system may take many forms. For example, information handling system 801 may take the form of a desktop, server, portable, laptop, notebook, or other form factor computer or data processing system. Information handling system 801 may also take other form factors such as a personal digital assistant (PDA), a gaming device, ATM machine, a portable telephone device, a communication device or other devices that include a processor and memory.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   receiving, at a server, a registration request from a client;
   identifying a source address included in the registration request that corresponds to the client;
   extracting a protocol layer address from the registration request that is included in the registration request's protocol layer information;
   comparing the source address with the protocol layer address;
   determining whether a network address translator is included in the network connection between the server and the client based upon comparing the source address with the protocol layer address;
   providing a discovery poll interval to the client in response to receiving the registration request, the discovery poll interval associated with a time that messages are sent between the server and the client in order to maintain a network connection on a computer network between the server and the client;
   detecting, after the providing, that the discovery poll interval should be adjusted;
   adjusting the discovery poll interval in response to the detecting, the adjusting comprising steps of:
      in response to determining that the network address translator is not included in the network connection between the server and the client, the method further comprises steps of:
         receiving a heartbeat message from the client at the server;
         determining, at the server, that a heartbeat source address included in the heartbeat message is different than the source address included in the registration request; and
         decrementing the discovery poll interval in response to determining that the heartbeat source address is different than the source address included in the registration request;
   providing the adjusted discovery poll interval to the client;
   determining that the adjusted discovery poll interval minimizes the amount of the messages that are sent between the server and the client while maintaining the network connection, the determining resulting in an optimum heartbeat interval; and
   in response to determining that the adjusted discovery poll interval minimizes the amount of the messages that are sent between the server and the client while maintaining the network connection, receiving the heartbeat message from the client at the server at the optimum heartbeat interval.

2. The method of claim 1 further comprising:
   in response to determining that the network address translator or firewall is included in the network connection between the server and the client, the adjusting results in incrementing the discovery poll interval in response to determining that the client received the discovery poll interval.

3. The method of claim 1 wherein, in response to determining that the network address translator is included in the network connection between the server and the client, decrementing the discovery poll interval in response to determining that the client did not receive the discovery poll interval.

4. The method of claim 1 further comprising:
   detecting a different client that is included on the network;
   identifying a different discovery poll interval corresponding to the different client; and
   using the different discovery poll interval during the adjusting of the discovery poll interval.

5. The method of claim 1 further comprising:
   after determining the optimum heartbeat interval, modifying the optimum heartbeat interval in response to detecting a change in the source address.

6. The method of claim 5 wherein the modifying further comprises:
   repeating the providing of the discovery poll interval to the client, the detecting, the adjusting, the providing of the adjusted poll interval, the determining, and the receiving.

* * * * *